US008242997B2

(12) United States Patent
Lee et al.

(10) Patent No.: US 8,242,997 B2
(45) Date of Patent: Aug. 14, 2012

(54) LIQUID CRYSTAL DISPLAY PANEL AND LIQUID CRYSTAL DISPLAY DEVICE HAVING THE SAME

(75) Inventors: Jae-Sic Lee, Suwon-si (KR); Il-Gon Kim, Seoul (KR); Cheol-Min Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1027 days.

(21) Appl. No.: 11/856,424

(22) Filed: Sep. 17, 2007

(65) Prior Publication Data

US 2008/0191989 A1 Aug. 14, 2008

(30) Foreign Application Priority Data

Feb. 9, 2007 (KR) ........................ 10-2007-0013642

(51) Int. Cl.
*G09G 3/36* (2006.01)
*G09G 5/00* (2006.01)
*G06F 3/038* (2006.01)

(52) U.S. Cl. ............... 345/92; 345/87; 345/90; 345/204

(58) Field of Classification Search ............ 345/83–104, 345/204–214, 690–699
See application file for complete search history.

(56) References Cited

U.S. PATENT DOCUMENTS

| | | | | |
|---|---|---|---|---|
| 6,414,665 | B2 * | 7/2002 | Libsch et al. | 345/92 |
| 6,778,162 | B2 * | 8/2004 | Kimura et al. | 345/90 |
| 6,876,348 | B2 * | 4/2005 | Murata et al. | 345/90 |
| 6,967,649 | B2 * | 11/2005 | Sun | 345/211 |
| 7,375,706 | B2 * | 5/2008 | Shih et al. | 345/87 |
| 2002/0075205 | A1 | 6/2002 | Kimura et al. | |
| 2003/0107535 | A1 * | 6/2003 | Numao | 345/76 |
| 2004/0189577 | A1 * | 9/2004 | Lin et al. | 345/98 |
| 2005/0057478 | A1 * | 3/2005 | Miyazawa | 345/96 |
| 2005/0062707 | A1 * | 3/2005 | Yamashita et al. | 345/96 |
| 2005/0174313 | A1 * | 8/2005 | Kawachi | 345/98 |
| 2005/0190133 | A1 * | 9/2005 | Kawachi | 345/87 |
| 2006/0187176 | A1 * | 8/2006 | Yang | 345/100 |

FOREIGN PATENT DOCUMENTS

| | | | |
|---|---|---|---|
| CN | 1561512 | | 1/2005 |
| JP | 2002-162938 | | 6/2002 |
| JP | 2002-207460 | | 7/2002 |
| JP | 2002-297106 | | 10/2002 |
| JP | 2003-099013 | | 4/2003 |
| JP | 2003099013 A | * | 4/2003 |
| JP | 2004-045748 | | 2/2004 |
| JP | 2006-084846 | | 3/2006 |
| KR | 10-2000-0035716 | * | 1/2002 |

* cited by examiner

*Primary Examiner* — Alexander Eisen
*Assistant Examiner* — Patrick F Marinelli
(74) *Attorney, Agent, or Firm* — F. Chau & Associates, LLC

(57) ABSTRACT

A liquid crystal display (LCD) panel includes a plurality of data and gate lines, a plurality of main switching elements, and a plurality of liquid crystal capacitors. Each main switching element is electrically connected to a main data and gate line. Each liquid crystal capacitor is electrically connected to a main switching element. The LCD panel further includes a plurality of partial gate lines to transmit a plurality of partial driving signals, a plurality of partial data lines to transmit a plurality of data signals, and a plurality of partial switching elements. Each partial switching element is turned on based on a partial driving signal to provide a memory with a data signal via a partial data line when a main switching element is enabled, and to provide a liquid crystal capacitor with a data signal stored in the memory when the main switching element is turned off.

18 Claims, 12 Drawing Sheets

LIQUID CRYSTAL DISPLAY PANEL AND LIQUID CRYSTAL DISPLAY DEVICE HAVING THE SAME

CROSS-REFERENCE TO RELATED APPLICATIONS

This application claims priority under 35 U.S.C. §119 to Korean Patent Application No. 2007-13642, filed on Feb. 9, 2007 in the Korean Intellectual Property Office (KIPO), the disclosure of which is incorporated by reference herein in its entirety.

BACKGROUND OF THE INVENTION

1. Technical Field

The present disclosure relates to a liquid crystal display (LCD) panel and more particularly, to an LCD device having an LCD panel.

2. Discussion of Related Art

A halftone display or a moving image display (hereinafter referred to as a normal display) can be used for small screens of cellular phones. Cellular phones may use a static image display during a standby mode and a normal display in full color during a calling mode. A normal display consumes more power than a static image display.

When a liquid crystal display (LCD) device is configured to enable switching between the normal display and the static image display, a static random-access memory (SRAM) driver and a source driver are needed. Consequently, reducing manufacturing costs of the LCD device can be difficult. Further, the constant switching between display types increases the power consumption of the LCD device.

An LCD panel for a mobile terminal can include a main screen area and a partial screen area. Various icon images are displayed in the partial screen area. For example, the icon images may include an icon displaying antenna reception, an icon displaying a vibration function, an icon displaying remaining battery power, etc. However, since a portion of the main screen area is used as the partial screen area, the size of the main screen area is substantially decreased.

Thus, there is a need for an LCD panel with a larger main screen area with reduced power consumption.

SUMMARY OF THE INVENTION

In an exemplary embodiment of the present invention, an LCD panel includes a plurality of gate lines, a plurality of main data lines, a plurality of main switching elements, a plurality of liquid crystal capacitors, a plurality of partial gate lines, a plurality of partial data lines and a plurality of partial switching elements. Each main switching element is electrically connected to a main data and gate line. Each liquid crystal capacitor is electrically connected to a main switching element. The partial gate lines transmit a plurality of partial driving signals. The partial data lines transmit a plurality of data signals. Each partial switching element is turned on based on a partial driving signal. The partial switching element provides a memory with a data signal via a partial data line when a main switching element is turned on, and provides a liquid crystal capacitor with the data signal stored in the memory when the main switching element is turned off.

The gate lines and the main data lines may define a display part including a main screen and a partial screen which overlaps with a portion of the main screen. For example, the partial gate lines may be formed in correspondence with the partial screen. The partial gate lines may be electrically connected to all of the partial switching elements formed in correspondence with the partial screen. The partial data lines may be formed in correspondence with the partial screen and commonly connected to the adjacent partial data lines.

In an exemplary embodiment of the present invention, an LCD panel includes a memory and a display part. The memory is disposed in a peripheral area of a display area. The display part includes a main screen formed in the display area and a partial screen. The main screen is activated during a full screen mode and is deactivated during a partial screen mode. The partial screen overlaps with a portion of the main screen. The partial screen is activated during the full screen mode and is activated based on a control of the memory during the partial screen mode.

The display part may include a plurality of gate lines, a plurality of data lines crossing the gate lines, and a plurality of partial gate lines being formed in an area of the partial screen. The partial gate lines may be commonly connected to each other. The display part may include a plurality of partial data lines crossing the partial gate lines. The display part may further include a bridge line connecting the partial data lines that are adjacent to each other.

The memory may include a plurality of memory cells and each of the memory cells may be electrically connected to at least two of the partial data lines. Each of the memory cells may include a static random-access memory (SRAM) cell, a first switch which is electrically connected to one of the partial data lines and the SRAM cell, and a second switch which is electrically connected to another one of the partial data lines, the first switch and the SRAM cell. Each of the first and second switches may include a transmission gate. The first and second switches may be alternately turned on based on a first inversion signal and a second inversion signal having a phase opposite to the first inversion signal, to control a data signal being written to or read from the SRAM cell. In an exemplary embodiment of the present invention, an LCD device includes a gate driving section, a source driving section, an LCD panel and a memory. The gate driving section outputs a plurality of gate signals. The source driving section outputs a plurality of data signals. The LCD panel includes a display part. The display part includes a main screen and a partial screen which overlaps with a portion of the main screen. The memory is disposed in a peripheral area surrounding the display part. The memory is deactivated during a full screen mode. The memory stores the data signals and provides the partial screen with the stored data signals to activate the partial screen during a partial screen mode. The memory may include static random-access memory (SRAM).

The display part may include a liquid crystal capacitor, a main switching element and a partial switching element. The main switching element provides the liquid crystal capacitor with a data signal in response to a gate signal. The partial switching element stores the data signal via the main switching element to the memory in response to a partial driving signal. The partial switching element provides the liquid crystal capacitor with a stored data signal.

The display part may include a main data line to electrically connect the source driving section to the main switching element, a main gate line to electrically connect the gate driving section to the main switching element, and a partial data line to electrically connect the memory to the partial switching element.

The memory may include a plurality of memory cells. Each of the memory cells is electrically connected to the partial data line. Each of the memory cells may be electrically connected to at least two partial data lines. The memory cell and the partial data line may be electrically connected to the partial screen. The partial data line may provide the memory cell with the data signal via the main and partial switching elements, and may provide the liquid crystal capacitor with the stored signal via the partial switching element. The partial gate line may be formed in correspondence with the partial screen.

BRIEF DESCRIPTION OF THE DRAWINGS

The present invention will become more readily apparent by describing in detail exemplary embodiments thereof with reference to the accompanying drawings, in which.

DETAILED DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present. Like numbers may refer to like elements throughout.

Hereinafter, exemplary embodiments of present invention will be described in detail with reference to the accompanying drawings.

Figure 1:
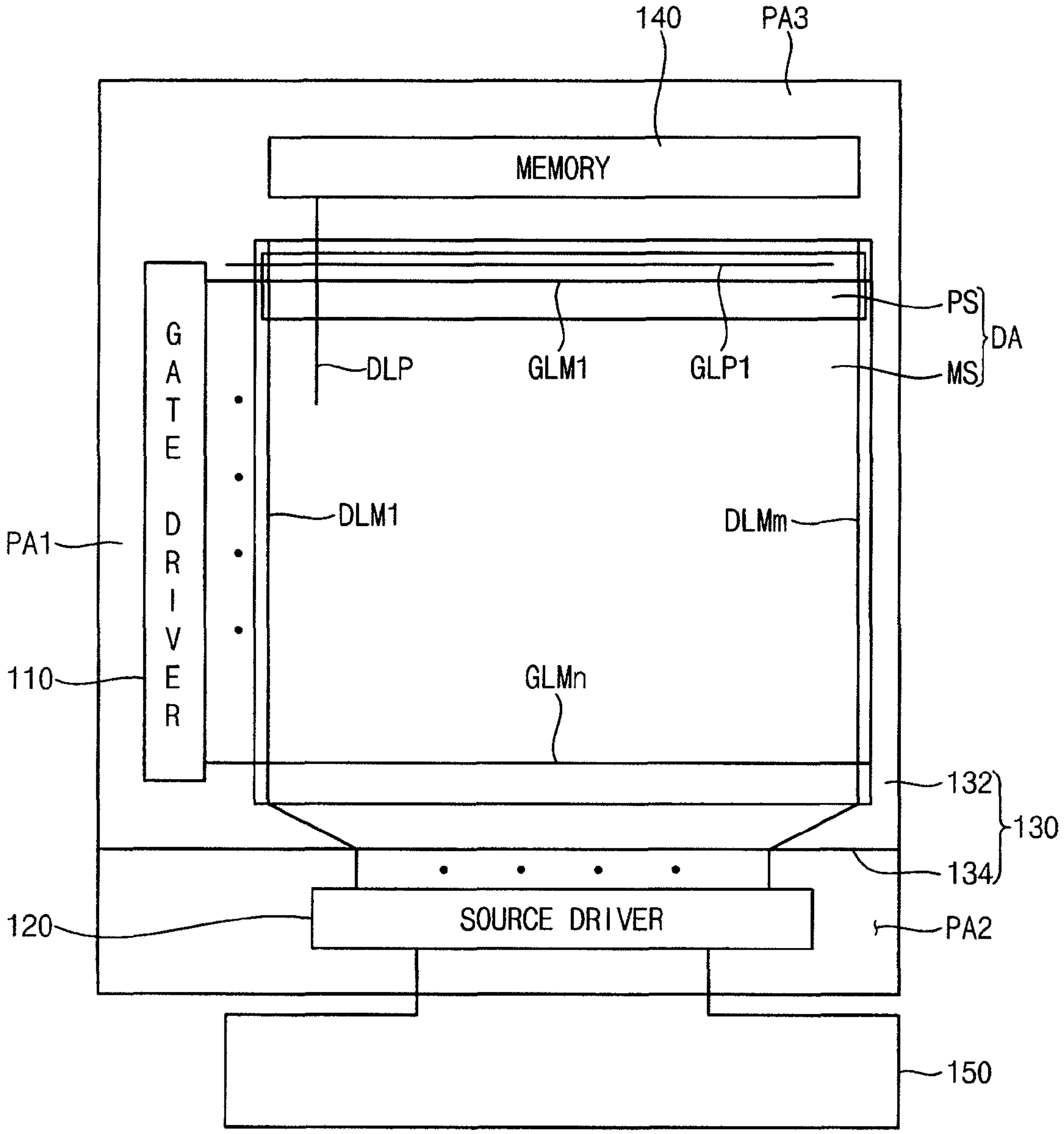
FIG. 1 is a block diagram illustrating a liquid crystal display (LCD) device according to an exemplary embodiment of the present invention.

FIG. 1 is a block diagram illustrating a liquid crystal display (LCD) device according to an exemplary embodiment of the present invention. Referring to FIG. 1, the LCD device includes a gate driving section 110, a source driving section 120, an LCD panel 130, a memory 140 and a flexible printed circuit board (FPCB) 150. The gate driving section 110 outputs a plurality of gate signals to the LCD panel 130. The source driving section 120 outputs a plurality of data signals to the LCD panel 130.

The LCD panel 130 includes a first substrate 132, a second substrate 134 facing the first substrate 132, and a liquid crystal layer (not shown) interposed between the first and second substrates 132 and 134. The first substrate 132 includes a display area DA, and first, second and third peripheral areas PA1, PA2 and PA3 surrounding the display area DA.

A plurality of gate lines GLM1 to GLMn and a plurality of data lines DLM1 to DLMm crossing the gate lines GL1 to GLn are formed in the display area DA. Here, 'n' and 'm' denote natural numbers.

A plurality of pixel parts P is present on the display area DA. Each of the pixel parts P may include an amorphous silicon thin-film transistor (a-Si TFT), a liquid crystal capacitor CLC electrically connected to the a-Si TFT, and a storage capacitor CST electrically connected to the liquid crystal capacitor CLC.

The display area DA includes a main screen MS and a partial screen PS that partially overlaps with the main screen MS. In a full screen mode, the main screen MS is activated to cover the entire display area DA. In a partial screen mode, the partial screen PS is activated, and the remaining area is deactivated.

The gate driving section 110 is formed in the first peripheral area PA1 and outputs a plurality of gate signals to the gate lines GLM1 to GLMn. The gate driving section 110 may include a plurality of a-Si TFTs.

The source driving section 120 is disposed in the second peripheral area PA2. The source driving section 120 outputs a plurality of source signals to the data lines DLM1 to DLMm. The source driving section 120 may be integrated in the first substrate 132 or mounted on the first substrate 132 in chip form. The source driving section 120 may include a plurality of n-type a-Si TFTs (n-TFTs) and a plurality of p-type a-Si TFTs (p-TFTs).

The memory 140 is disposed in the third peripheral area PA3. The memory 140 stores data signals provided from the source driving section 120 during a partial screen mode, and provides a partial screen PS with the stored data signals to activate the partial screen. The memory 140 is deactivated during a full screen mode.

The FPCB 150 is electrically connected to the LCD panel 130, and provides the source driving section 120 with an image signal and a plurality of driving signals from an external device.

Figure 2:
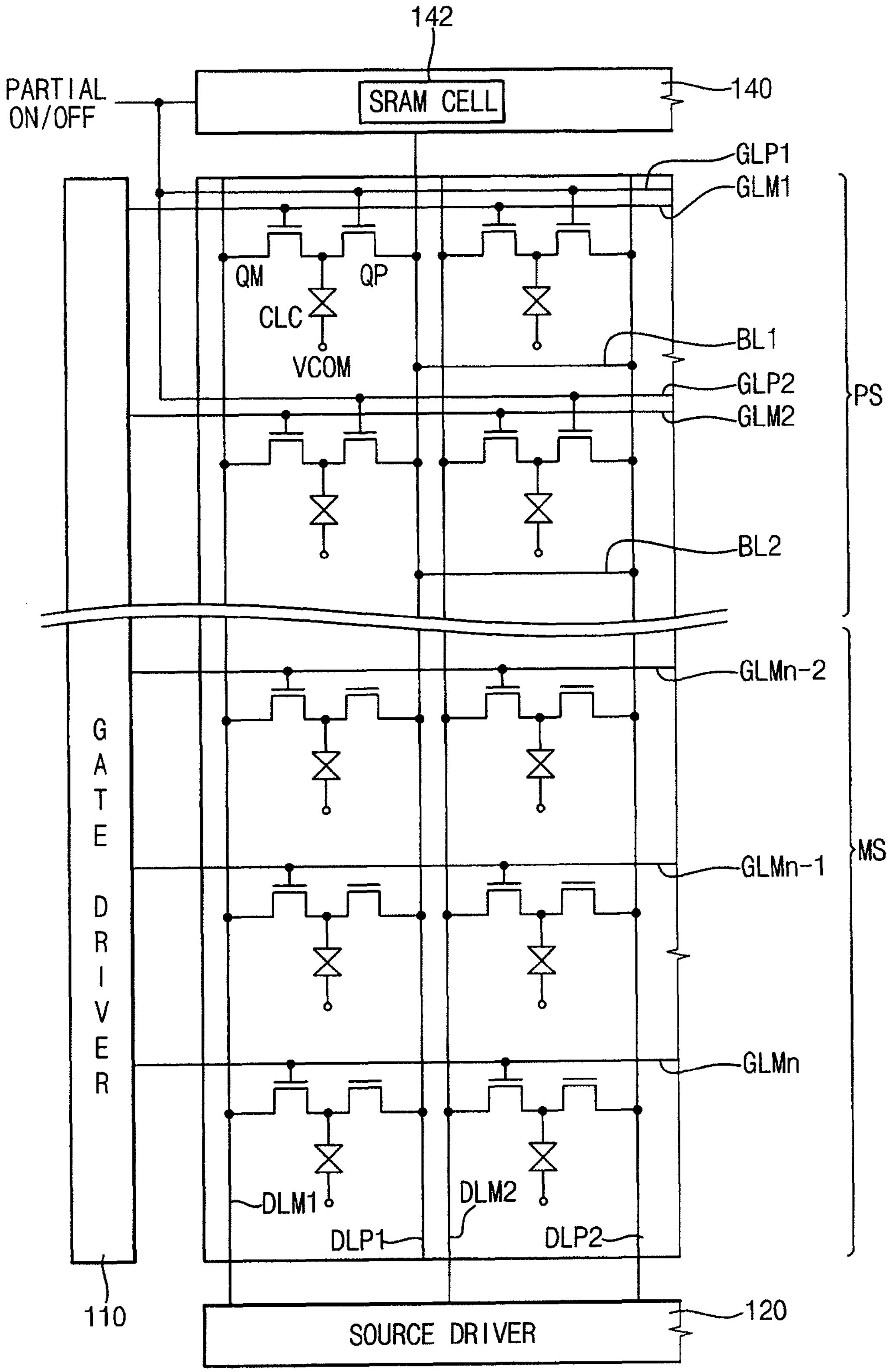
FIG. 2 is an equivalent circuit diagram illustrating the display section of FIG. 1, according to an exemplary embodiment of the present invention.

FIG. 2 is an equivalent circuit diagram illustrating the display section of FIG. 1. Referring to FIGS. 1 and 2, the display part corresponding to the display area DA includes a plurality of main gate lines GLM1, GLM2, . . . , GLMn-2, GLMn-1 and GLMn, a plurality of main data lines DLM1 and DLM2, a plurality of main switching elements QM, a plurality of liquid crystal capacitors CLC, a plurality of partial gate lines GLP1 and GLP2, a plurality of partial data lines DLP1 and DLP2, a plurality of partial switching elements QP and a plurality of bridge lines BL1 and BL2. The display part may further include a storage capacitor CST (not shown) electrically connected to each of the liquid crystal capacitors CLC.

The main gate lines GLM1, GLM2, . . . , GLMn-2, GLMn-1 and GLMn are formed in a horizontal direction when viewed in a plan view, and transmit gate signals from the gate driving section 110 to the main switching elements QM.

The main data lines DLM1 and DLM2 are formed along a vertical direction when viewed in a plan view. The main data lines DLM1 and DLM2 transmit data signals from the source driving section 120 through the main switching elements QM to the liquid crystal capacitors CLC.

Each of the main switching elements QM is electrically connected to an adjacent one of the main data lines DLM1 and DLM2 and an adjacent one of the main gate lines GLM1, GLM2, . . . , GLMn-2, GLMn-1 and GLMn. Each of the liquid crystal capacitors CLC includes a first end terminal electrically connected to a corresponding one of the main switching elements QM and a second end terminal receiving a common electrode voltage VCOM. In a full screen mode, the liquid crystal capacitors CLC are charged according to a data signal provided through a corresponding one of the main data lines DLM1 and DLM2 and a corresponding one of the main switching elements QM. In a partial screen mode, the liquid crystal capacitors CLC are charged according to a data signal provided through a corresponding one of the partial data lines DLP 1 and DLP 2.

The partial gate lines GLP1 and GLP2 transmit partial driving signals from an external device to each of the partial switching elements QP. Each of the partial driving signals includes a partial driving on signal (PARTIAL ON) and a partial driving off signal (PARTIAL OFF). The partial data lines DLP1 and DLP2 transmit data signals from each of the main switching elements QM to a static random-access memory (SRAM) cell 142 of the memory 140, and provide each of the liquid crystal capacitors CLC with data signals stored in the SRAM cell 142.

Each of the partial switching elements QP is formed in an area defined by adjacent partial data and gate lines. Each of the partial switching elements QP is turned on by a corresponding one of the partial driving on signals PARTIAL ON to provide a data signal to the SRAM cell 142 through a partial data line when a corresponding one of the main switching elements QM is turned on. When the corresponding main switching element QM is turned off, the partial switching element QP provides a corresponding one of the liquid crystal capacitors CLC with a data signal stored in the SRAM cell 142.

The bridge lines BL1 and BL2 electrically connect partial data lines DLP1 and DLP2 that are adjacent to each other. Thus, at least two of the pixel parts (i.e., 2×2 numbers of pixel parts in FIG. 2) are grouped to be electrically connected to one unit memory cell 142.

As described above, the memory 140 is disposed in the third peripheral area PA3 surrounding the display area DA of the LCD panel 130. The main screen MS and the partial screen PS which overlaps with a portion of the main screen MS are defined in the display area DA.

Figure 3:
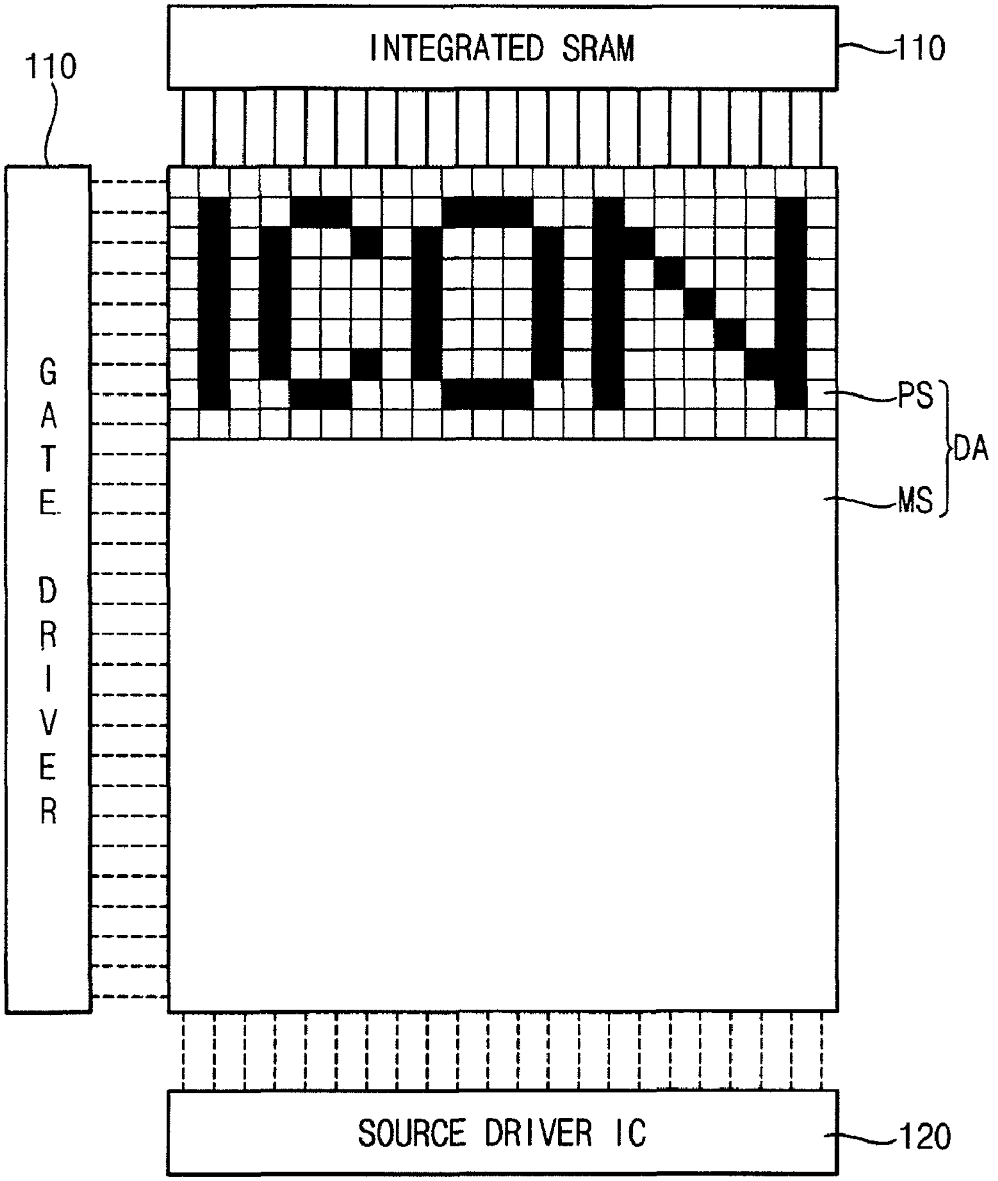
FIG. 3 is a schematic diagram illustrating a partial screen mode of the display section of FIG. 2.

FIG. 3 is a schematic diagram illustrating a partial screen mode of the display section of FIG. 2. Referring to FIGS. 2 and 3, in the partial screen mode, the main switching elements QM formed in the main screen MS are periodically activated to write data corresponding to the partial screen to the memory, and the partial switching elements QP formed in the partial screen PS are activated. The data signals written in the memory 140 are stored in the liquid crystal capacitors CLC electrically connected to the partial switching elements QP, so that a partial display operation, such as displaying an icon, may be performed.

Figure 4:
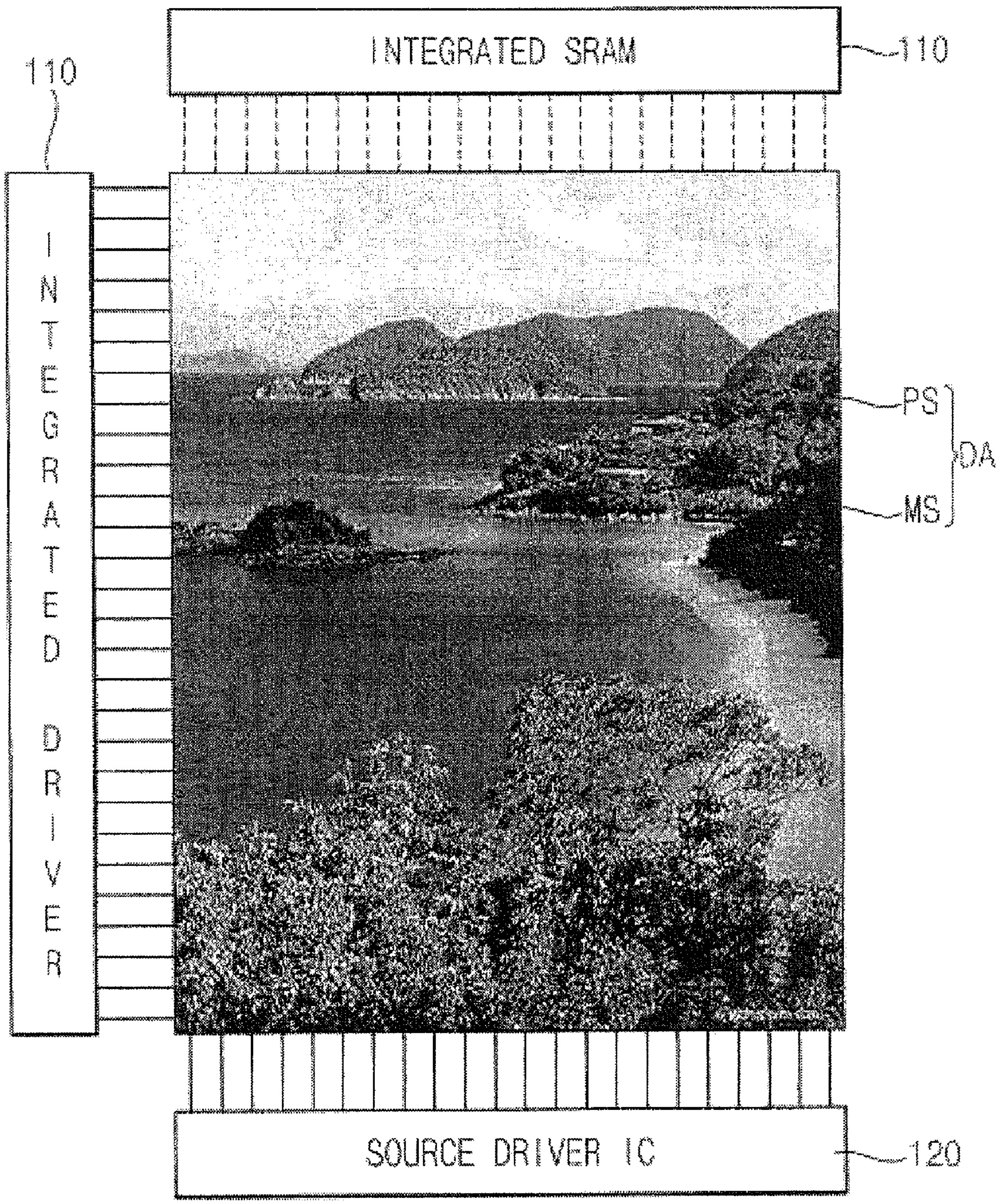
FIG. 4 is a schematic diagram illustrating a full screen mode of the display section of FIG. 2.

FIG. 4 is a schematic diagram illustrating a full screen mode of the display section of FIG. 2. Referring to FIGS. 2 and 4, in the full screen mode, the memory 140 is not activated. However, the gate and source driving sections 110 and 120 are activated, so that the data signals output from the source driving section 120 are provided to the liquid crystal capacitors CLC corresponding to the main screen MS and the liquid crystal capacitors CLC corresponding to the partial screen PS to display an image.

Figure 5:
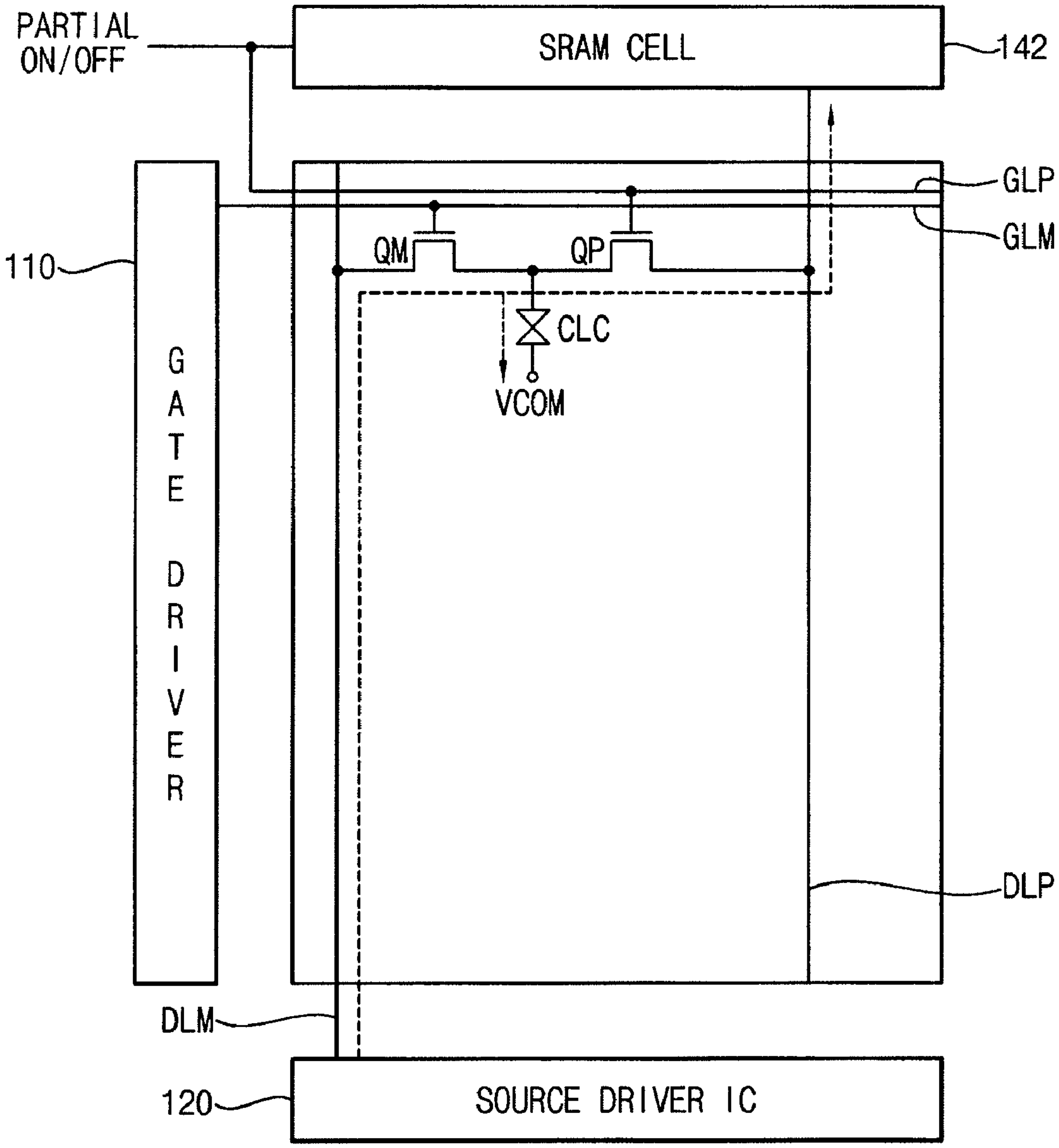
FIG. 5 is a schematic diagram illustrating a write operation of a data signal, according to an exemplary embodiment of the present invention.
Figure 6:
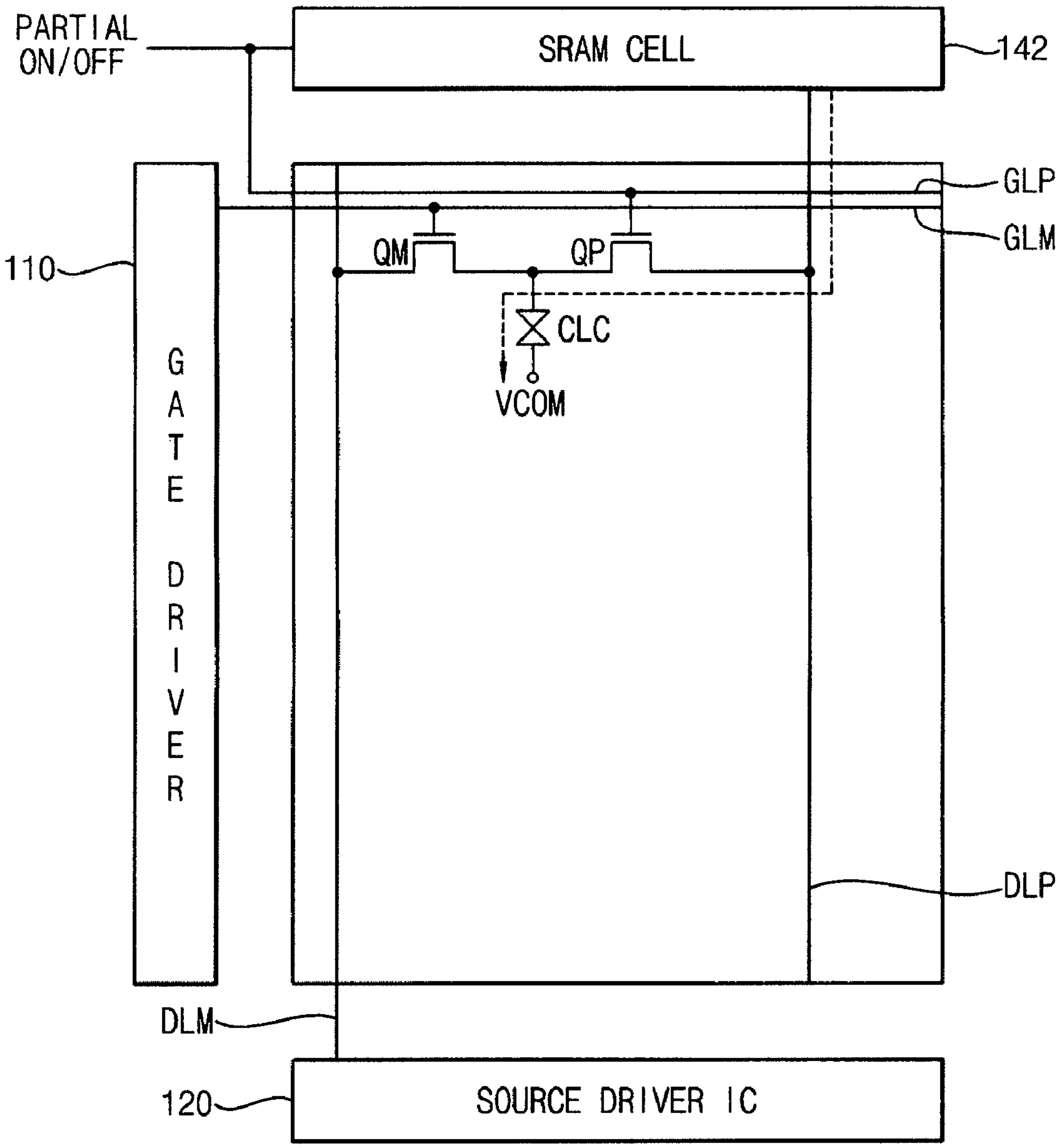
FIG. 6 is a schematic diagram illustrating a hold operation of a data signal according to an exemplary embodiment of the present invention.

FIG. 5 is a schematic diagram illustrating a write operation of a data signal according to an exemplary embodiment of the present invention. FIG. 6 is a schematic diagram illustrating a hold operation of a data signal according to an exemplary embodiment of the present invention.

Referring to FIGS. 2 and 5, in the partial screen mode, the data signal provided from the source driving section 120 charges a liquid crystal capacitor CLC corresponding to a pixel area in response to the gate signal provided from the gate driving section 110.

Here, the partial switching element QP is turned on based on a partial driving signal PARTIAL ON that is provided from an external device, so that the data signal provided from the source driving section 120 is written to the unit memory cell 142.

Referring to FIGS. 2 and 6, when the data signal is written to the unit memory cell 142, the gate driving section 110 and the source driving section 120 are not driven when the image signal does not change, and the unit memory cell 142 directly drives the LCD panel 130.

In the full screen mode, the gate driving section 110 and the source driving section 120 drive the LCD panel 130 in a normal manner, and make use of the main screen MS and the partial screen PS as a display area. When the partial driving off signal PARTIAL OFF is applied to the partial gate lines which correspond to the partial screen, the main screen MS and the partial screen PS have a pixel structure that is substantially the same as the normal LCD panel 130, thereby realizing a full screen mode.

Figure 7:
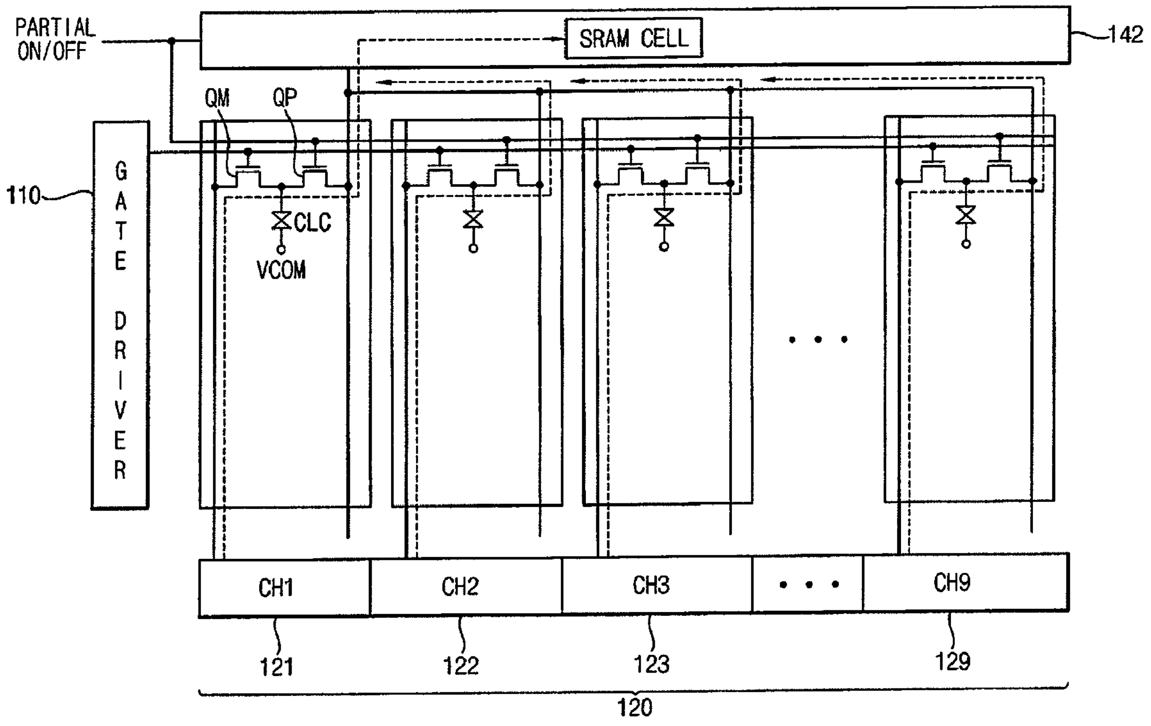
FIG. 7 is a schematic diagram illustrating a write operation of a data signal in correspondence with a plurality of output channels and a unit memory cell of a source driving section of FIG. 1, according to an exemplary embodiment of the present invention.

FIG. 7 is a schematic diagram illustrating a write operation of a data signal in correspondence with a plurality of output channels and a unit memory cell of a source driving section of FIG. 1.

Referring to FIG. 7, one unit memory cell 142 is electrically connected to a plurality of pixel parts. The source driving section 120 includes a plurality of outputting channels 121, 122, 123, . . . , 129. In the partial screen mode, the data signals output from the output channels 121 to 129 charge each of the liquid crystal capacitors CLC corresponding to the pixel areas in response to the gate signals output from the gate driving section 110.

The partial switching elements QP corresponding to each of the pixel areas are turned on based on the partial driving on signal PARTIAL ON that is provided from an external device. The data signals provided from the source driving section 120 are written to the unit memory cell 142.

Figure 8:
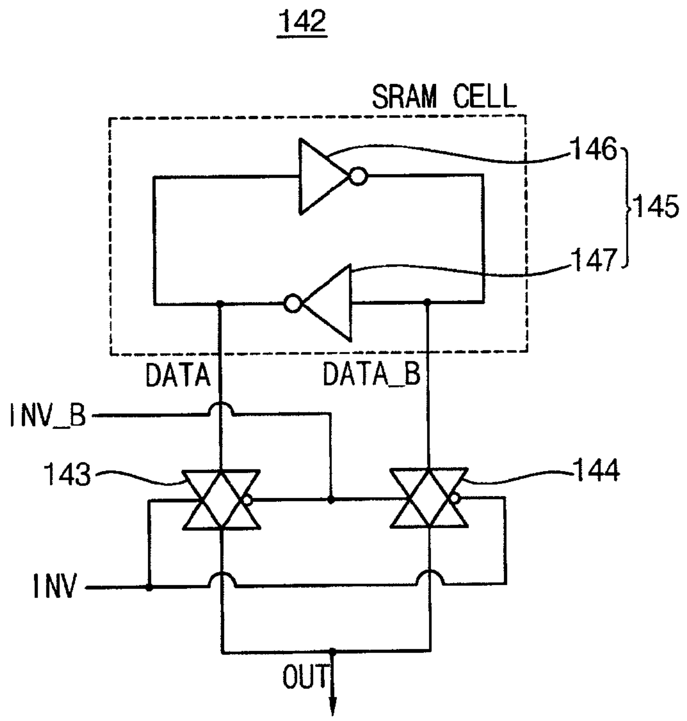
FIG. 8 is an equivalent circuit diagram illustrating the unit memory cell of FIG. 7, according to an exemplary embodiment of the present invention.
Figure 9:
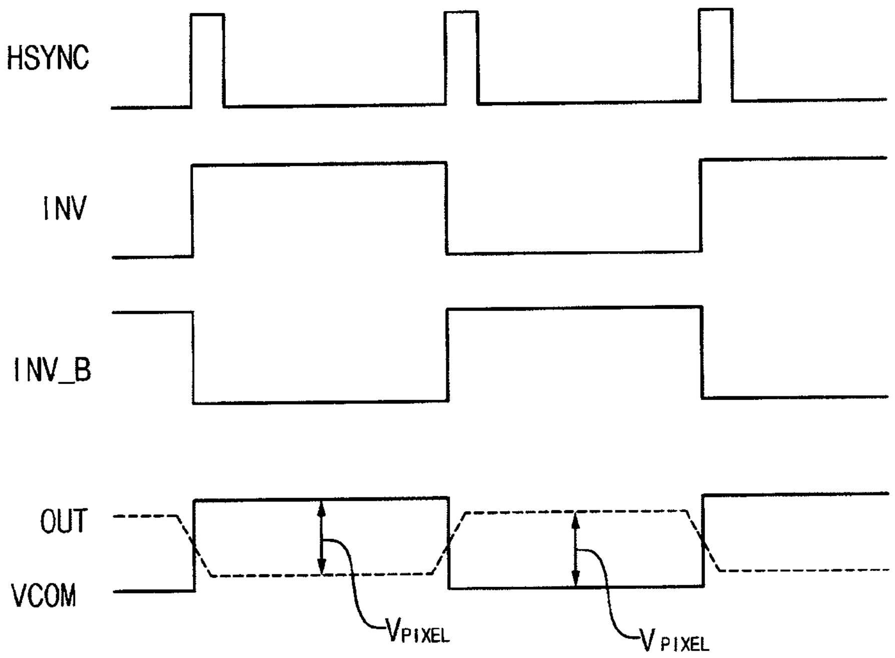
FIG. 9 is a waveform diagram illustrating the operation of the unit memory cell of FIG. 7.

FIG. 8 is an equivalent circuit diagram illustrating the unit memory cell of FIG. 7, according to an exemplary embodiment of the present invention. FIG. 9 is a waveform diagram illustrating the operation of the unit memory cell of FIG. 7.

Referring to FIG. 8, the unit memory cell 142 includes a first switch 143, a second switch 144 and a SRAM cell 145 electrically connected to the first and second switches 143 and 144. Each of the first and second switches 143 and 144 may include a transmission gate, respectively.

The first switch 143 includes a first end terminal electrically connected to the partial data line and a second end terminal electrically connected to a first end terminal of the SRAM cell 145. The first switch 143 performs a switching operation for writing or outputting a data signal, in response to a first inversion signal INV and a second inversion signal INV_B that are provided from an external device.

The second switch 144 includes a first end terminal electrically connected to the partial data line, and a second end terminal electrically connected to a second end terminal of the SRAM cell 145. The second switch 144 performs a switching operation for writing or outputting a data signal, in response to the first and second inversion signals INV and INV_B that are provided from an external device.

The first and second switches 143 and 144 alternately perform a switching operation for writing a data signal to the SRAM cell 145. For example, when the first inversion signal INV of a high level and the second inversion signal INV_B of a low level are applied to the first switch 143, the first switch 143 is turned on so that a data signal provided from the source driving section 120 is written to the SRAM cell 145. Alternately, when the second inversion signal INV_B of a high level and the first inversion signal INV of a low level are applied to the second switch 144, the second switch 144 is turned on so that a data signal provided from the source driving section 120 is written to the SRAM cell 145.

The first and second switches 143 and 144 alternately perform a switching operation for outputting a data signal to the source driving section 120.

For example, when the first inversion signal INV of a high level and the second inversion signal INV_B of a low level are applied to the first switch 143, the first switch 143 is turned on so that a data signal written to the SRAM cell 145 is output to the source driving section 120. Alternately, when the second inversion signal INV_B of a high level and the first inversion signal INV of a low level are applied to the second switch 144, the second switch 144 is turned on so that a data signal written to the SRAM cell 145 is output to the source driving section 120.

Accordingly, a line inversion is accomplished in the partial screen of the LCD panel 130.

The SRAM cell 145 includes a first inverter 146 and a second inverter 147. An input terminal of the first inverter 146 is electrically connected to the first switch 143, and an output terminal of the first inverter 146 is electrically connected to the second switch 144. An input terminal of the second inverter 147 is electrically connected to the second switch 144, and an output terminal of the second inverter 147 is electrically connected to the first switch 143.

The SRAM cell 145 stores data signals output from the source driving section 120 via the partial data line based on a switching operation of the first and second switches 143 and 144. The SRAM cell 145 provides the liquid crystal capacitor CLC with the stored data signal via the partial data line and the partial switching element QP based on a switching operation of the first and second switches 143 and 144.

Referring to FIG. 9, the first inversion signal INV transitions from a low level to a high level, when a horizontal synchronizing signal HSYNC is activated. Thus, a data signal having a negative polarity with respect to a common voltage VCOM is output from the unit memory cell 142.

For example, when the first inversion signal INV of a high level is applied to a non-inversion control terminal of the first switch 143 and the second inversion signal INV_B of a low level is applied to an inversion control terminal of the first switch 143, the first switch 143 is turned on. Therefore, a signal stored between the first inverter 146 and the second inverter 147 is output to the liquid crystal capacitors formed in a pixel group through the first switch 143. Here, the second inversion signal INV_B of a low level is applied to the non-inversion control terminal of the second switch 144 and the first inversion signal INV of a high level is applied to the inversion control terminal of the second switch 144, so that the second switch 144 is turned off.

During a hold period when a negative polarity data signal is output to a liquid crystal though the first switch 143, and when a new data signal is applied through a data line electrically connected to the liquid crystal capacitor, the new data signal is written to the SRAM cell 145 through the first switch 143.

The horizontal synchronizing signal HSYNC is again activated based on the first inversion signal INV that transitions from a high level to a low level, so that a data signal having a negative polarity with respect to the common voltage VCOM is output from the unit memory cell 142.

For example, when the second inversion signal INV_B of a high level is applied to a non-inversion control terminal of the second switch 144 and the first inversion signal INV of a low level is applied to an inversion control terminal of the second switch 144, the second switch 144 is turned on. Therefore, a signal stored between the first inverter 146 and the second inverter 147 is output to the liquid crystal capacitors formed in a pixel group through the second switch 144. Here, the first inversion signal INV of a low level is applied to the non-inversion control terminal of the first switch 143 and the second inversion signal INV_B of a high level is applied to the inversion control terminal of the first switch 143, so that the first switch 143 is turned off.

During a hold period when a positive polarity data signal is output to the liquid crystal though the second switch 144, and when a new data signal is applied through a data line electrically connected to the liquid crystal capacitor, the new data signal is written to the SRAM cell 145 through the second switch 144.

Figure 10A:
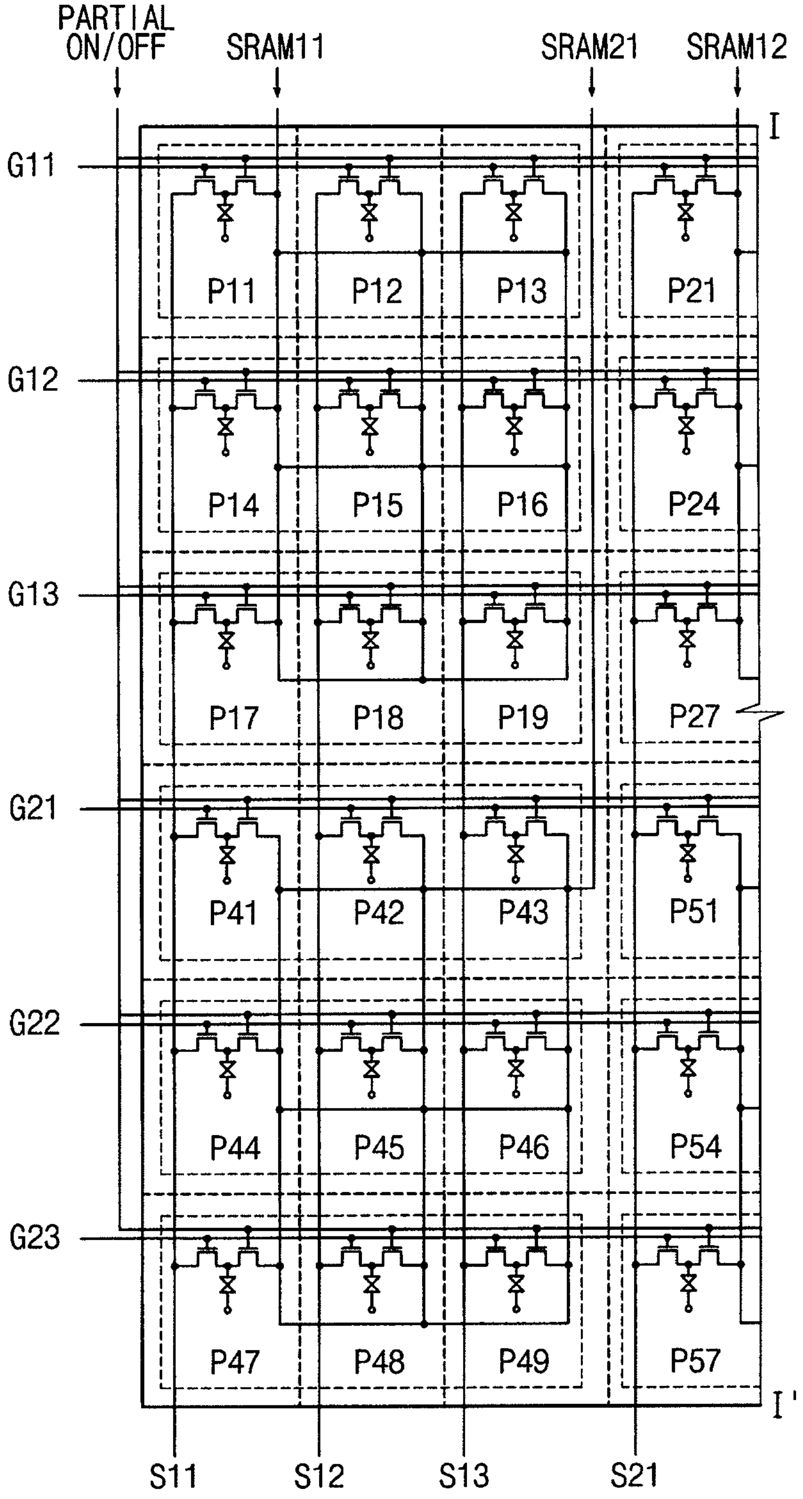
FIGS. 10A and 10B are equivalent circuit diagrams respectively illustrating two halves of an LCD panel corresponding to the partial screen of FIG. 1, according to an exemplary embodiment of the present invention.
Figure 10B:
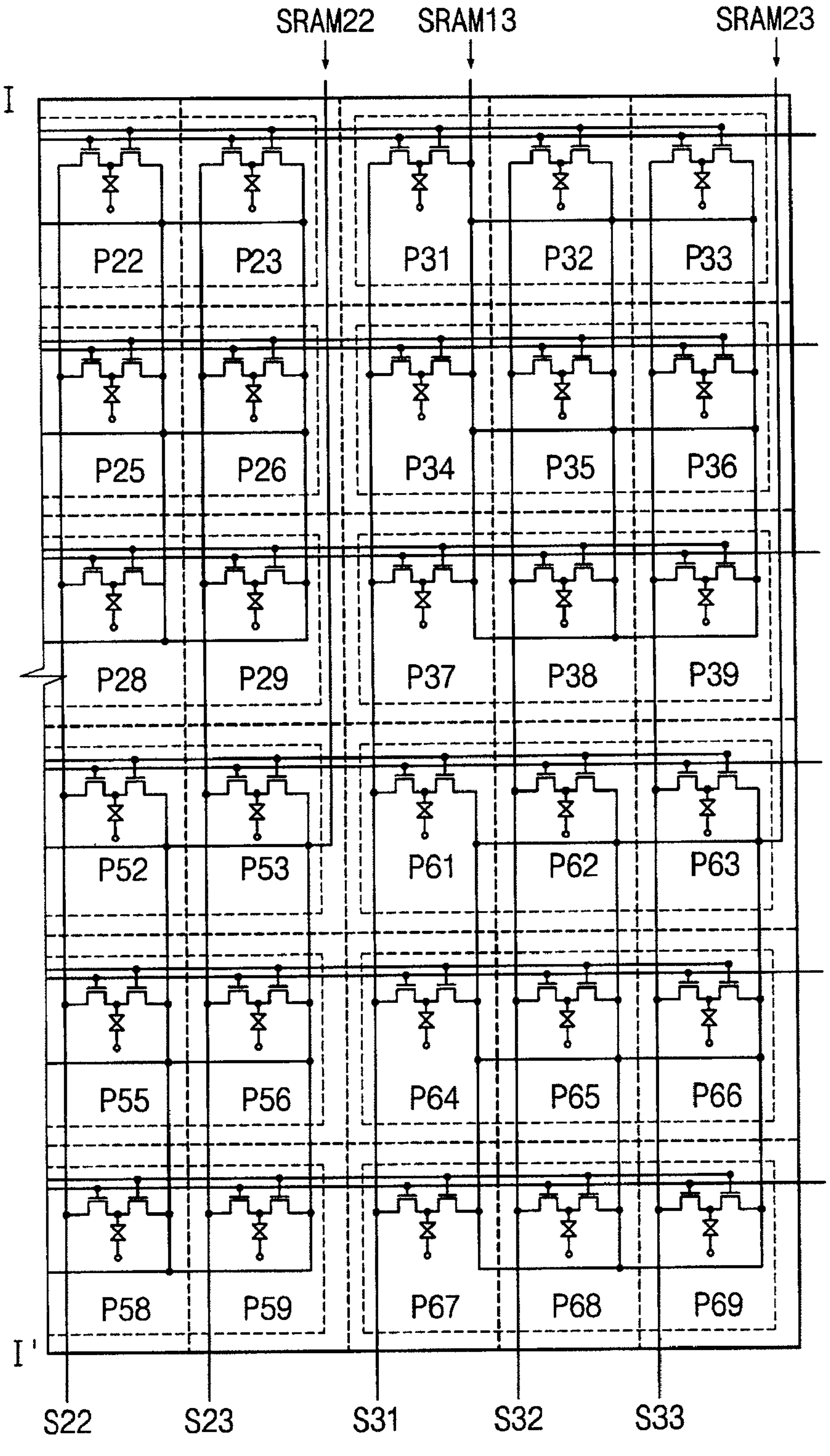

FIGS. 10A and 10B are equivalent circuit diagrams respectively illustrating two halves of an LCD panel corresponding to the partial screen of FIG. 1, according to an exemplary embodiment of the present invention.

Referring to FIGS. 1, 10A and 10B, in the LCD panel 130 corresponding to the partial screen, the partial switching elements QP are arranged in a predetermined number of groups in a matrix shape. The partial switching elements QP in each of the groups are electrically connected to each other. In the present exemplary embodiment, the partial switching elements QP are grouped into 3×3 matrixes. The grouped partial switching elements may define a pixel group.

In FIGS. 10A and 10B, nine pixels P11, P12, P13, P14, P15, P16, P17, P18 and P19 may define a first pixel group, which are defined by the first to third main gate lines G11, G12 and G13 and the first to third main data lines S11, S12 and S13. Nine pixels P21, P22, P23, P24, P25, P26, P27, P28 and P29 may define a second pixel group, which are defined by the first to third main gate lines G11, G12 and G13 and the fourth to sixth main data lines S21, S22 and S23. The first pixel group and the second pixel group are disposed adjacent to each other along the main gate line direction.

Nine pixels P41, P42, P43, P44, P45, P46, P47, P48 and P49 may define a third pixel group, which are defined by the fourth to sixth main gate lines G21, G22 and G23 and the first to third main data lines S11, S12 and S13. Nine pixels P51, P52, P53, P54, P55, P56, P57, P58 and P59 may define a fourth pixel group, which are defined by the fourth to sixth main gate lines G21, G22 and G23 and the fourth to sixth main data lines S21, S22 and S23. The third pixel group and the fourth pixel group are disposed adjacent to each other along the main gate line direction.

The bridge lines BL are formed substantially in parallel to the partial gate lines GLP to electrically connect to the adjacent partial data lines DLP. The bridge lines BL electrically connect to the partial switching elements QP that are arranged along a row direction.

Figure 11A:
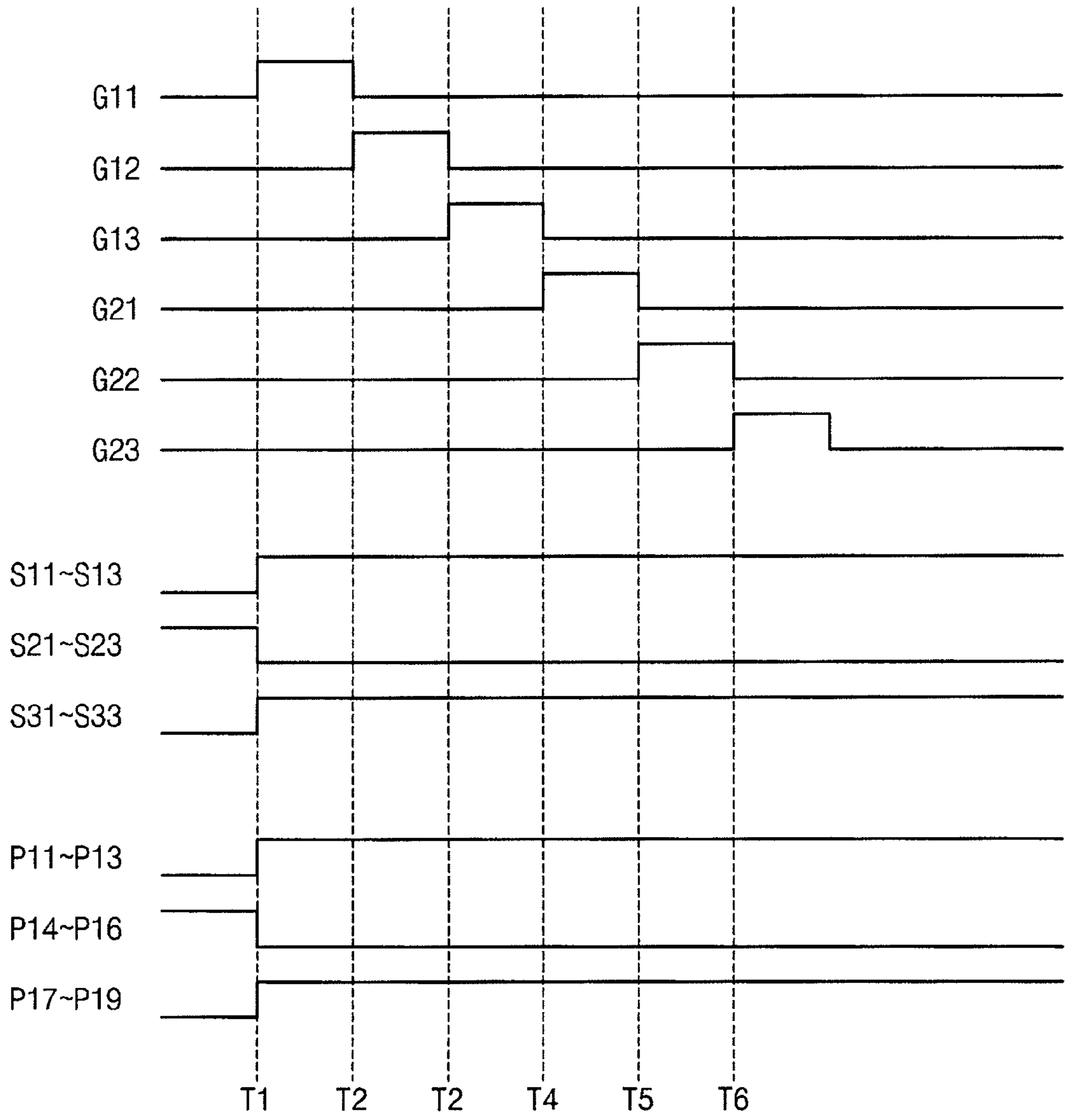
FIGS. 11A and 11B are waveform diagrams illustrating the operation of the partial screen mode of FIG. 1.
Figure 11B:
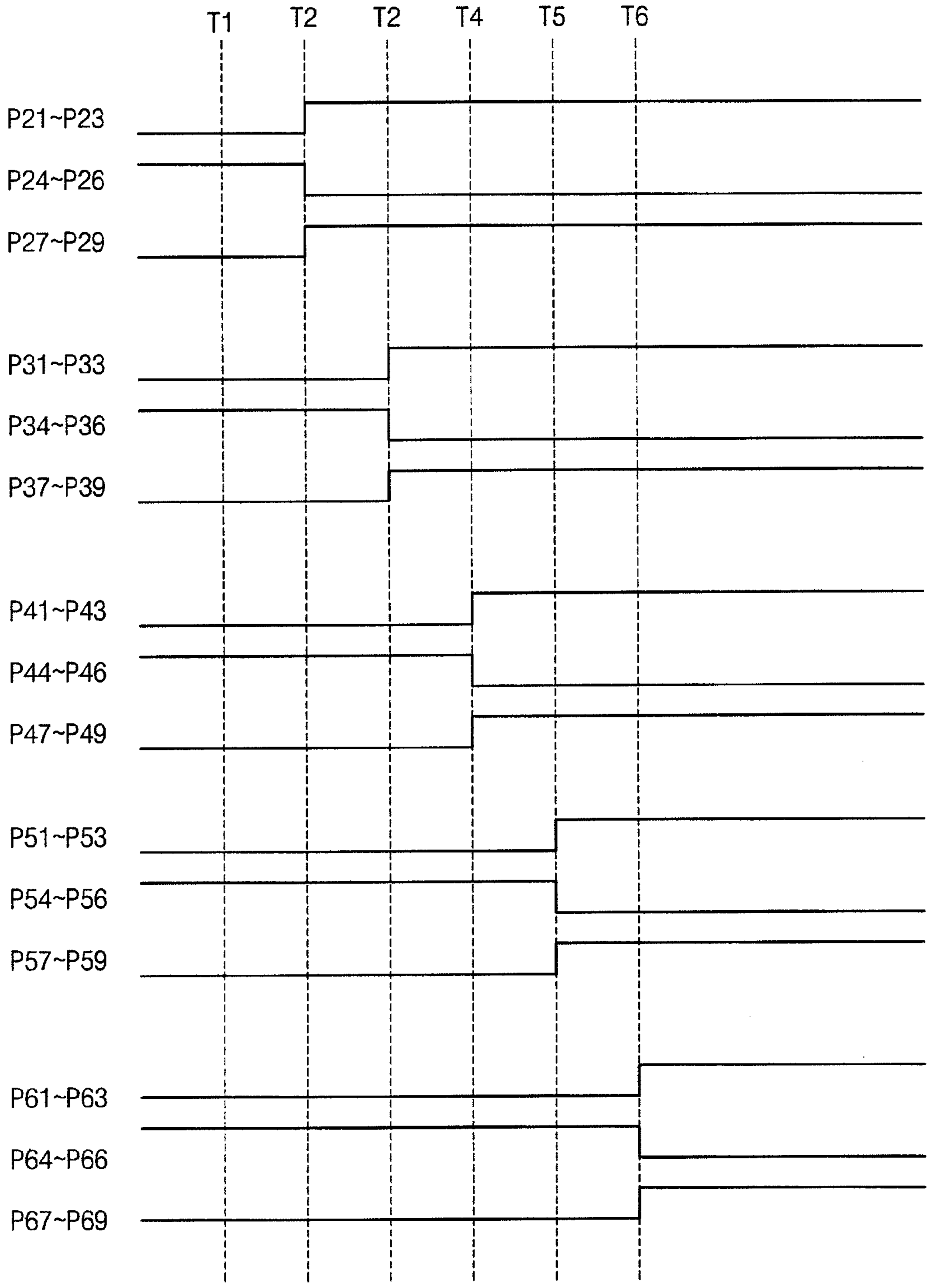

FIGS. 11A and 11B are waveform diagrams illustrating the operation of the partial screen mode of FIG. 1.

Referring to FIGS. 10A, 10B, 11A and 11B, a period during which at least one of the first to third main gate lines G11, G12 and G13 is turned on may be defined as a first period, and a period during which at least one of the fourth to sixth main gate lines G21, G22 and G23 is turned on may be defined as a second period.

During the first period, the source driving section 120 provides each of the first to third main data lines S11, S12 and S13 with a first data signal having a positive polarity with respect to a common voltage VCOM.

During the second period, the source driving section 120 provides each of the fourth to sixth main data lines S21, S22 and S23 with a second data signal having a positive polarity with respect to a common voltage VCOM. In the present exemplary embodiment, a level of the first data signal is greater than that of the second data signal. For example, the first data signal may be about 6V, and the second data signal may be about 4V.

In the present exemplary embodiment, the common voltage has a relatively low level during the first period, and has a relatively high level during the second period. For example, a common voltage VCOM of a relatively low level may be about 3 V, and a common voltage VCOM of a relatively high level may be about 7 V.

During the first period, the first data signal that is applied to the first to third data lines S11, S12 and S13 is applied to the first pixel group P11 to P19, and the second data signal that is applied to the fourth to sixth data lines S21, S23 and S23 is applied to the second pixel group P21 to P29.

Here, the common voltage VCOM has a relatively low level, so that a polarity of the data signal stored in the first pixel group P11 and P19 is a positive polarity with respect to the common voltage VCOM. For example, the common voltage VCOM is about 3 V, and the data signal stored in the first pixel group P11 to P19 is about 6 V, so that the data signal stored in the first pixel group P11 to P19 has a positive polarity with respect to the common voltage VCOM.

A polarity of the data signal stored in the second pixel group P21 to P29 is a positive polarity with respect to the common voltage VCOM. For example, the common voltage VCOM is about 3 V, and the data signal stored in the second pixel group P21 to P29 is about 4 V, so that the data signal stored in the second pixel group P21 to P29 has a positive polarity with respect to the common voltage VCOM.

During the second period, the first data signal applied to the first to third data lines S11, S12 and S13 is applied to the third pixel groups P41 to P49, and the second data signal applied to the fourth to sixth data lines S21, S22 and S23 is applied to the fourth pixel group P51 to P59.

Here, the common voltage VCOM has a relatively high level, so that a polarity of the data signal stored in the third pixel group P41 to P49 is a negative polarity with respect to the common voltage VCOM. For example, the common voltage VCOM is about 7 V, and the data signal stored in the third pixel group P41 to P49 is about 6 V, so that the data signal stored in the first pixel group P11 to P19 has a negative polarity with respect to the common voltage VCOM.

A polarity of the data signal charged in the fourth pixel group P51 to P49 is a negative polarity with respect to the common voltage VCOM. For example, the common voltage VCOM is about 7 V, and the data signal stored in the fourth pixel group P51 to P59 is about 4 V, so that the data signal stored in the fourth pixel group P51 to P59 has a negative polarity with respect to the common voltage VCOM.

According to at least one embodiment of the present invention, a memory is disposed in a peripheral area surrounding a display area of an LCD panel. The display area includes a main screen and a partial screen which overlaps with a portion of the main screen. Main switching elements are formed in the display areas, which are disposed in a matrix shape.

In a partial screen mode, the main switching elements formed in the main screen are deactivated, and partial switching elements formed in the partial screen are activated.

In a full screen mode, the main switching elements formed in the main and partial screens are activated, so that normal display operation may be performed. Accordingly, in the full screen mode, an area corresponding to the partial screen may be used as a display area. Therefore, the main screen and the partial screen which overlaps with the main screen are defined, so that the size of the main screen area may be substantially increased.

Further, the memory disposed in the peripheral area surrounding the display area enables the partial screen mode, so that power consumption may be decreased. In addition, a manufacturing cost of the LCD device and a weight of the LCD device may be decreased.

Having described exemplary embodiments of the present invention, it is to be understood that the present invention is not limited to these exemplary embodiments and various changes and modifications can be made by one ordinary skilled in the art within the spirit and scope of the present invention as hereinafter claimed.

What is claimed is:

1. A liquid crystal display (LCD) panel comprising:

a plurality of gate lines;

a plurality of main data lines;

a plurality of main switching elements, each main switching element being electrically connected to a main data and gate line;

a plurality of liquid crystal capacitors, each liquid crystal capacitor being electrically connected to a main switching element;

a plurality of partial gate lines transmitting a plurality of partial driving signals;

a plurality of partial data lines transmitting a plurality of data signals; and a plurality of partial switching elements, each partial switching element being turned on based on a partial driving signal, wherein the partial switching element provides a memory with a data signal via a partial data line when a main switching element is turned on, and provides a liquid crystal capacitor with the data signal stored in the memory when the main switching element is turned off, wherein the gate lines and the main data lines define a display part, wherein the display part includes a plurality of bridge lines, wherein the display part comprises a main screen and a partial screen, a part of the partial screen overlaps with a part of the main screen and the bridge lines are located only within the partial screen, wherein the partial screen includes at least two pixels and one of the bridge lines connects the partial data line of one of the at least two pixels in a row to the partial data line of another one of the at least two pixels in a same row, and the one bridge line receives the data signal stored in the memory when the main switching element is turned off, wherein the one bridge line is located between one of the pixels of the partial screen and another pixel of the liquid crystal display panel, and wherein the one bridge line crosses one of the main data lines.

2. The LCD panel of claim 1, wherein the partial gate lines are formed in correspondence with the partial screen.

3. The LCD panel of claim 2, wherein the partial gate lines are electrically connected to all of the partial switching elements formed in correspondence with the partial screen.

4. The LCD panel of claim 1, wherein the partial gate lines formed in correspondence with the partial screen are commonly connected to adjacent partial data lines.

5. The LCD panel of claim 1, wherein the one bridge line is substantially parallel to the gate lines.

6. A liquid crystal display (LCD) panel comprising:

a memory disposed in a peripheral area of a display area; and a display part comprising a main screen formed in the display area and a partial screen which overlaps a portion of the main screen, wherein the main screen is activated during a full screen mode and deactivated during a partial screen mode and the partial screen is activated during the full screen mode and is activated based on a control of the memory during the partial screen mode, wherein the display part comprises:

a plurality of gate lines;

a plurality of data lines crossing the gate lines; and a plurality of partial gate lines formed in an area of the partial screen, a plurality of partial data lines crossing the partial gate lines, wherein the memory comprises a plurality of memory cells and each of the memory cells is electrically connected to at least two of the partial data lines, wherein the display part includes a plurality of bridge lines and the bridge lines are located only within the partial screen, wherein the partial screen includes at least two pixels and one of the bridge lines connects the partial data line of one of the at least two pixels to the partial data line of another one of the at least two pixels, and the one bridge line receives a data signal from a corresponding one of the memory cells, wherein the one bridge line crosses one of the main data lines, and wherein the one bridge line is located between one of the pixels of the partial screen and another pixel of the liquid crystal display panel.

7. The LCD panel of claim 6, wherein each of the memory cells comprises:

a static random-access memory (SRAM) cell;

a first switch electrically connected to one of the partial data lines and the SRAM cell; and a second switch electrically connected to another one of the partial data lines, the first switch and the SRAM cell.

8. The LCD panel of claim 7, wherein each of the first and second switches comprises a transmission gate, and the first and second switches are alternately turned on based on a first inversion signal and a second inversion signal having a phase opposite to the first inversion signal, to control a data signal being written to the SRAM cell.

9. The LCD panel of claim 7, wherein the first and second switches are alternately turned on based on a first inversion signal and a second inversion signal having a phase opposite to the first inversion signal, to control a data signal being read out from the SRAM cell.

10. The LCD panel of claim 6, wherein the at least two pixels comprises:

a first pixel group electrically connected to a predetermined number of the partial gate lines and a first memory cell;

a second pixel group disposed adjacent to the first pixel group, the second pixel group being electrically connected to a first group of the partial gate lines electrically connected to the first pixel group and a second memory cell;

a third pixel group disposed adjacent to the first pixel group, the third pixel group electrically connected to a second group of the partial gate lines electrically connected to the first pixel group and a third memory cell; and a fourth pixel group, wherein the first and third pixel groups are charged using data signals with different polarities, respectively.

11. The LCD panel of claim 10, wherein the second pixel group is charged by the same polarity data signal as that of the first pixel group, and the fourth pixel group is charged by the same polarity data signal as that of the third pixel group.

12. The LCD panel of claim 6, wherein the one bridge line is substantially parallel to the gate lines.

13. A liquid crystal display (LCD) device comprising:

a gate driving section to output a plurality of gate signals;

a source driving section to output a plurality of data signals;

a liquid crystal display panel comprising a display part having a main screen and a partial screen which overlaps with a portion of the main screen; and a static random-access memory disposed in a peripheral area surrounding the display part, wherein the memory is deactivated during a full screen mode, and the memory stores the data signals and provides the partial screen with the stored data signals to activate the partial screen in a partial screen mode:

wherein the display part includes a plurality of main data lines and a plurality of partial data lines, wherein only the partial screen includes a plurality of bridge lines, and wherein the partial screen includes at least two pixels, and one of the bridge lines connects the partial data line of one of the at least two pixels in a row to the partial data line of another one of the at least two pixels in a same row, and the one bridge line receives a data signal stored in the memory, wherein the one bridge line is located between one of the pixels of the partial screen and another pixel of the liquid crystal display panel, and wherein the one bridge line crosses one of the main data lines.

14. The LCD device of claim 13, wherein the display part comprises a plurality of pixels and each pixel comprises:

a liquid crystal capacitor;

a main switching element to provide the liquid crystal capacitor with a data signal in response to a gate signal; and a partial switching element to store the data signal via the main switching element to the memory in response to a partial driving signal, and to provide the liquid crystal capacitor with a stored data signal.

15. The LCD device of claim 14, wherein the display part comprises:

a plurality of main gate lines to electrically connect the gate driving section to a corresponding one of the main switching elements; and a plurality of partial gate lines to transmit the partial driving signal to a corresponding one of the partial switching elements, wherein the main data lines electrically connect the source driving section to the main switching elements, wherein the partial data lines electrically connect the memory to the partial switching elements.

16. The LCD device of claim 15, wherein a corresponding one of the partial data lines provide the memory cell with the data signal via the main and partial switching elements, and provides the liquid crystal capacitor with stored data signal via the partial switching element.

17. The LCD device of claim 15, wherein the partial gate lines are formed in correspondence with the partial screen.

18. The LCD device of claim 13, wherein the one bridge line is substantially parallel to the gate lines.

* * * * *